Figure 1:
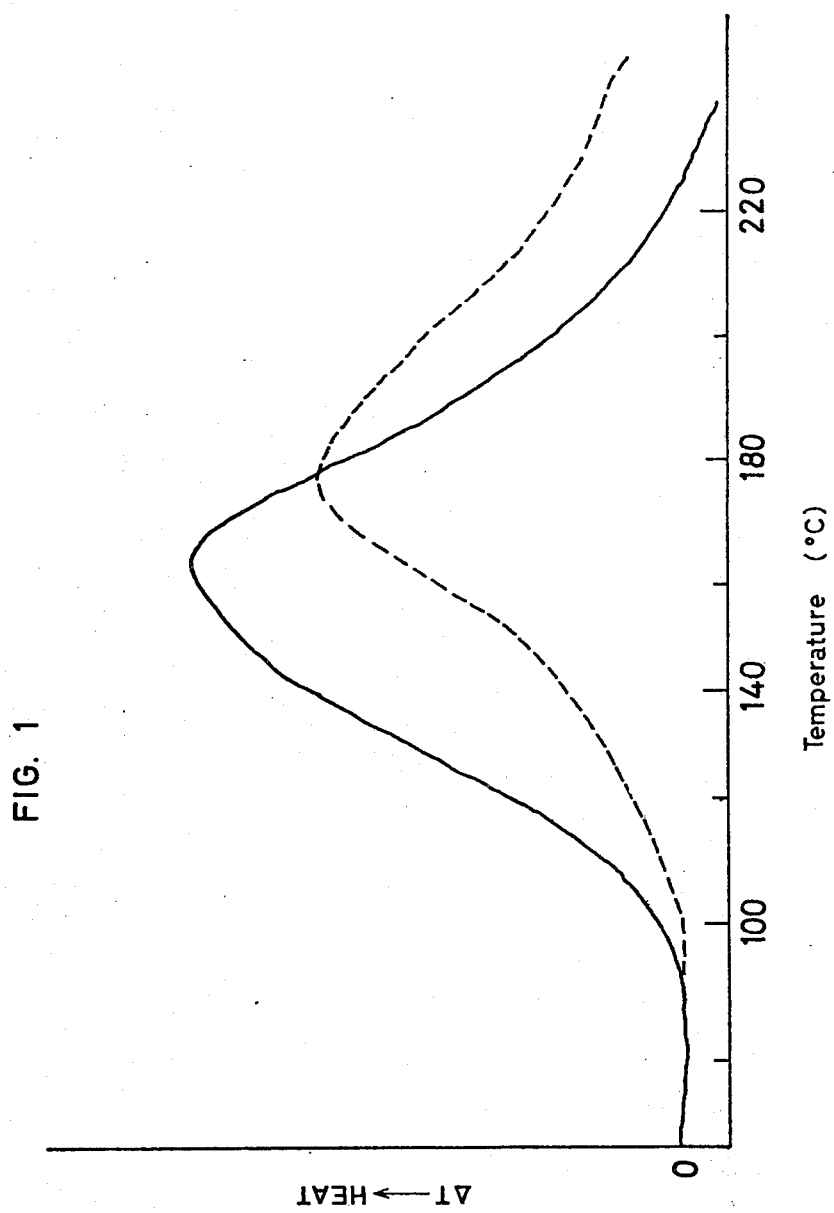

United States Patent [19]
Mori et al.

[11] 3,972,846
[45] Aug. 3, 1976

[54] CURABLE URETHANE RESIN COMPOSITION COMPRISING A MIXTURE OF POLYISOCYANATE, ACTIVE HYDROGEN COMPOUND AND DIKETO COMPOUND

[75] Inventors: Atsuo Mori, Hirakata; Shuji Kitamura, Toyonaka; Kohji Yamatsuta, Takatsuki, all of Japan

[73] Assignee: Sumitomo Chemical Company, Limited, Osaka, Japan

[22] Filed: Oct. 30, 1974

[21] Appl. No.: 519,213

[30] Foreign Application Priority Data
Oct. 31, 1973 Japan............................... 48-123125

[52] U.S. Cl............................. 260/30.4 N; 252/182; 260/31.2 N; 260/32.8 N; 260/33.8 UB; 260/33.6 UB; 260/47 CB; 260/77.5 R; 260/77.5 AB; 260/77.5 AA; 260/77.5 A; 260/77.5 AP; 260/77.5 AM
[51] Int. Cl.².......................................... C08G 18/00
[58] Field of Search............... 260/77.5 R, 77.5 AB, 260/77.5 AA, 47 CB, 77.5 A, 77.5 AP, 77.5 AM, 31.2 N, 32.8 N, 30.4 N, 33.8 UB, 33.6 UB; 252/182

[56] References Cited
UNITED STATES PATENTS
3,314,834 4/1967 Walden et al................... 260/77.5 A
3,538,027 11/1970 Stein et al...................... 260/77.5 AP

*Primary Examiner*—M. J. Welsh
*Attorney, Agent, or Firm*—Wenderoth, Lind & Ponack

[57] ABSTRACT

The present invention provides for a curable polyurethane composition comprising a keto compound and a liquid mixture of an organic aliphatic polyfunctional polyisocyanate and a compound having active hydrogen, the keto compound having the general formula:

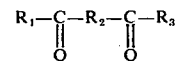

wherein $R_1$ and $R_2$ are each an alkyl group, an aromatic group, and a heterocyclic group, which may be the same or different, and $R_2$ is a lower alkylene or alkenyl group having 1 to 2 carbon atoms. The curable polyurethane composition is characterized by exhibiting a long pot life due to the existence of the aforementioned keto compound therein.

6 Claims, 2 Drawing Figures

CURABLE URETHANE RESIN COMPOSITION COMPRISING A MIXTURE OF POLYISOCYANATE, ACTIVE HYDROGEN COMPOUND AND DIKETO COMPOUND

The present invention relates to a curable urethane composition having an extended pot life (the period during which the resin can be used). More particularly, the invention is concerned with a curable resin composition having an extremely prolonged pot life by adding a diketo compound to a liquid mixture of a urethane composition consisting of an organic aliphatic polyfunctional polyisocyanate and a compound having active hydrogen, or to said liquid mixture containing a solvent and/or a reactive diluent in case of necessity.

In the production of coating film, foam, etc. of polyurethane, since the liquid mixture of an organic polyfunctional polyisocyanate and a compound having active hydrogen at its terminals has a short pot life, it has been the common practice to mix the two liquids just before use. Namely, the liquid mixture of an organic polyfunctional polyisocyanate and a compound having active hydrogen (the starting materials of polyurethane) or said liquid mixture containing a solvent and/or a reactive diluent in case of necessity, becomes viscous gradually with the passage of time to make the operation impossible finally. This phenomenon is more conspicuously observed at elevated temperatures (above 40°C.). Accordingly, from the viewpoint of operation efficiency and stability in operation, it is an indispensable requirement for users of polyurethane compositions to obtain an extended pot life without effecting any change in curing conditions. Heretofore, there have been known various methods for extending the pot life of the liquid mixture of an organic polyfunctional polyisocyanate and a compound having active hydrogen. For example, a method is generally known wherein a hydrolyzable chloride is added to the mixture. However, since this method changes the curing mechanism of the system, there is a defect that it increases the cure time unduly. Another known method for obtaining an extended pot life is to add a diketo compound to the mixture together with a cure catalyst such as ferric acetylacetonate, dibutyl tin dilaurate, copper chromite, etc. (U.S. Pat. No. 3,314,834). This method is based on the idea that the extremely short pot life of the mixture resulting from rapid or explosive progress of the reaction casued by the addition of the above-mentioned catalyst to the liquid mixture of an organic polyfunctional polyisocyanate and a compound having active hydrogen, can be prevented by suppressing the activity of the cure catalyst at a comparatively low temperature, utilizing the phenomenon that the diketo compound and the metallic ion of the cure catalyst form a chelate compound in the liquid mixture at about room temperature. At the normal curing temperature, the chelate compound is dissociated, whereby the curing catalyst becomes active again to accomplish curing in a short time. But by following this method, it is difficult to extend the pot life to at least a longer period than the pot life of a system containing no curing catalyst, and tracing experiments by us did not give a satisfactory, long pot life. There is still another method wherein, for the purpose of extending the pot life, the terminal isocyanate group is previously blocked with a certain kind of active hydrogen-containing compounds, for example alcohols such as methanol, ethanol, propanol, etc.; phenols such as phenol, cresol, etc.; diketo compounds such as acetylacetone, ethyl acetoacetate, etc.; thiols such as benzene thiol, 1dodecane thiol, etc. (Journ. of Japanese Chemical Society, vol. 80, page 434). In this method, since the activity of the isocyanate groups is lost at room temperature, the pot life of the mixture liquid is extended to an infinite period. This method, however, requires a troublesome step wherein, prior to the addition of the active hydrogen-containing compound, the blocking agent must be mixed in an amount stoichiometrically equal to the isocyanate groups, to perform a previous treatment, and moreover in most cases, the liquid organic isocyanate compound becomes solid by this previous treatment so that the operation efficiency is extremely lowered. In addition, if the blocking agent is of a high boiling point, it will remain in the cured product to cause undesirable effects such as the lowering of the physical properties thereof, or will produce an offensive smell over a long period. If the blocking agent has a low boiling point, it will escape in large amount outside the system, whereby the health of the operators may be injured, or a secondary environmental pollution may follow which results from its escape outside the workshop.

We have made researches to obtain a long pot life in respect to the aforementioned composition which was not obtained by the above-mentioned conventional methods, without performing any complicated treatment thereupon. As a result, we have discovered pot life-extending agents as mentioned hereinafter.

It has been found that the pot life can be extremely extended by the addition of 0.001 to 1 weight part of a diketo compound represented by the general formula:

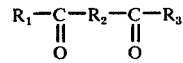

wherein $R_1$ and $R_3$ are each an alkyl group, aromatic group, heterocyclic group, etc. which may be the same or different groups and may contain substituents such as halogen atoms; $R_2$ is a lower alkylene or alkenyl group containing 1 or 2 carbon atoms, per 100 weight parts of a liquid mixture of a urethane composition consisting of an organic polyfunctional polyisocyanate (among organic polyfunctional polyisocyanates, aliphatic polyisocyantes are particularly effective) and an active hydrogen-containing compound, or said liquid mixture containing a suitable solvent and/or reactive diluent in case of necessity. It has been found that the diketo compound not only does not prevent the curing reaction even at elevated temperatures but also it has a function of accelerating the reaction.

The invention will be further explained as follows partly by referring to the accompanying drawings wherein;

FIG. 1 is a chart of differential thermal analysis showing the exothermic aspect of a system composed of a urethane mixture of hexamethylene diisocyanate type, containing 0.05 weight part acetylacetone (solid line) and the system which does not contain it (broken line). In this drawing, the ordinate shows the amount of heat generated and the abscissa shows the temperature. The rate of temperature rise was 20°C./min. The amount of the samples was both 45 mg.

Figure 2:
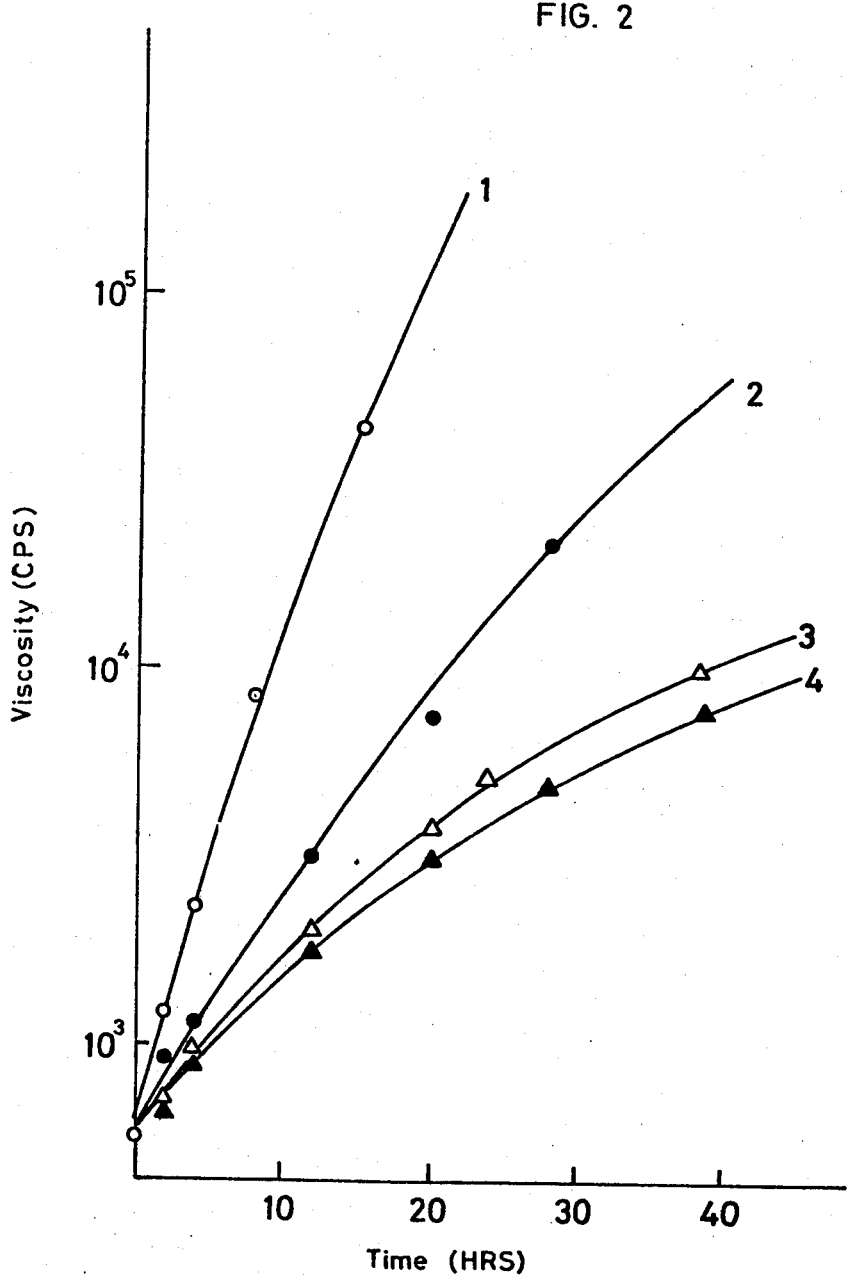

FIG. 2 is a diagram showing viscosity/time change at 30°C. of systems composed of the same composition as in FIG. 1, each containing 0.02, 0.06, and 0.1 part acetylacetone. In the diagram, the numerals 1, 2, 3, and 4 show the cases where acetylacetone was added in an amount of 0, 0.02, 0.06 and 0.1 part, respectively.

In accoradance with the present invention, by the addition of 0.05 weight part of the diketo compound per 100 weight parts of the urethane composition in the liquid mixture, the gradient of the viscosity rise of the liquid at room temperature was suppressed to one-half to one-third in comparison with the control (refer to FIG. 2). Upon curing, the diketo compound did not extend the curing time. Surprisingly, it was found that on the contrary the compound had the effect of accelerating the reaction at high temperatures (refer to FIG. 1). It is supposed that this effect is caused by a mechanism entirely different from that involved in conventional processes wherein diketo compounds such as acetylacetone, etc. have been heretofore used as blocking agents for organic polyisocyanates. Namely, the amount of these diketo compounds used as blocking agents for organic polyisocyanates has been considered necessary to be equimolar to isocyanate groups, and they can be used with good results either with aliphatic polyisocyanates or aromatic polyisocyanates, regardless of the kind of polyisocyanates. But the diketo compounds used in the present invention have characteristic features such that they do not require any complicated pre-treatment, their amount of use is so surprisingly small as to be about 1/3,000 to 1/500 of the amount to be used as blocking agents, and they show no or very small pot life-extending effect for liquid urethane compositions whose organic polyisocyanates are aromatic polyisocyanates, e.g. tolylene diisocyanate, methaphenylene diisocyante, naphphalene diisocyanate, xylylene diisocyanate, etc. This surprising fact of the small amount of use required is quite unlike the heretofore known effect as blocking agents or pot life-extending effects caused by the formation of a chelate compound with a curing catalyst, and is supposed to result from the suppression of the reaction between the isocyanate groups and the active hydrogen-containing compound by the coordination of these diketo compounds of strong polarity around the isocyanate groups of the organic aliphatic polyisocyanate. It is surprising that these diketo compounds have a pot life-extending effect for aliphatic polyisocyanates but not for aromatic polyisocyanates. This phenomenon is supposed to result from the electron atmosphere that has been changed by resonance structure between the benzene ring and the lone electron pairs of nitrogen atoms in the isocyanate groups, or from steric hindrance of the benzene ring.

The organic polyfunctional polyisocyanates that can be used in the present invention include methyl diisocyanate, ethyl diisocyanate, n-butyl diisocyanate, n-propyl diisocyanate, octadecyl diisocyanate, hexamethylene diisocyanate, and their oligomers, prepolymers and mixtures.

As the curing agents for the organic polyisocyanates, there can be used active hydrogen-containing compounds that are generally used, for example as those having hydroxyl groups, there may be mentioned water, polyhydric alcohols such as ethylene glycol, polyethylene glycol (having a degree of polymerization above 2), propylene glycol, polypropylene glycol (having a degree of polymerization above 2), glycerine, trimethylolpropane, polyethylene adipate, polytetrahydrofurn, 1,4-butanediol, 1,4-butinediol; phenols such as bisphenol A; polyester type polyols; amines such as ammonia, ethylamine, n-propylamine, n-butylamine, aniline; and their copolymers.

These organic polyfunctional polyisocyanates and active hydrogen-containing compounds can be used in various ratios, and preferably in a mol ratio of 1:1.

As the solvents that can be used in the present invention, there may be recited: esters such as methyl acetate, ethyl acetate, isopropyl acetate, cellosolve acetate; ketones such as acetone, methyl ethyl ketone, methyl isobutyl ketone, cyclohexanone; cyclic ethers such as tetrahydrofuran, dioxane; hologenated hydrocarbons such as methylene chloride, ethylene chloride; aromatic hydrocarbons such as toluene, xylene.

Among the reactive diluents that can be used in the present invention, there may be enumerated: compounds containing an unsaturated group in the molecule such as styrene and its derivatives, methyl methacrylate, acrylonitrile, hydroxyethyl methacrylate, polyethylene glycol monomethacrylate, hydroxypropyl methacrylate, polypropylene glycol dimethacrylate; epoxy compounds such as glycidyl methacrylate, allyl glycidyl ether, butyl glycidyl ether, higher fatty acid glycidyl ether; and their hardener acid anhydrides such as phthalic anhydride, succinic anhydride, methylnadic anhydride.

As the diketo compounds that can be used in the present invention, there may be mentioned: acetylacetone, 1-phenyl-1,3-butanedione, trans-1,4-diphenyl-2-butene-1,4-one, 4,4,4-trifluoro-1-(2-thienyl)-1,3-butanedione, 1,3-diphenyl-1,3-propanedione, etc. These diketo compounds may be mixed in any manner. For example, the diketo compounds are mixed uniformly under stirring with a liquid organic polyfunctional polyisocyanate, and then an active hydrogen-containing compound is added to this mixture; or an organic polyfunctional polyisocyanate and an active hydrogen-containing compound are mixed, and then the diketo compounds are added to this mixture. The preferred amount of addition of these pot life-extending agents is in the range of from 0.001 to 1.0 weight part per 100 weight parts of the urethane composition. When the amount of addition is less than 0.001 weight part, no substantial pot life-extending effect is observed. When the amount of addition is above 1.0 part, the increase of the pot life-extending effect is not only small in relation to the increase of addition, but causes an undesirable effect such as worsening of the surface condition of the cured product. The range for best results is from 0.01 to 0.1 weight part.

The composition of the present invention can be used for various purposes such as paints, foam products, elastomers, adhesives, etc.

The present invention will be explained in more detail by way of examples hereinafter, but the invention is by no means limited by these examples.

Example 1

Compounding:
Desmodure N (trimer of hexamethylene diisocyanate, produced by Farbenfabriken Bayer A. G.)     235 g.
Tripropylene glycol     60 g.
Bisphenol A     20 g.
Trimethylolpropane     20 g.

In the case of this compounding, bisphenol A and trimethylolpropane were first dissolved in tripropylene glycol under heating at 100°C. After this polyol mixture was cooled to room temperature, it was thoroughly stirred together with Desmodur N until a uniform mixture was formed. Three same mixtures were prepared. To each of these mixtures, 0.067 g. (0.02 weight part), 0.201 g. (0.06 weight part) and 0.335 g. (0.1 weight part) of acetylacetone were added, respectively, and the resulting mixtures were thoroughly stirred again. Part of each mixture was applied on a glass plate so as to become several hundred micron thick, and was cured in a hot air current dryer maintained at 150°C. for 20 minutes. Each of the mixtures gave a cured polyurethane film having the same hardness as that obtained from the same system containing no acetylacetone. Forty mg. of each of the mixture liquids was weighed out and their exothermic aspect upon curing was examined by differential thermal analysis. The results are shown in FIG. 1. It is seen from the diagram that the liquid to which 0.05 part acetylacetone had been added showed more rapid generation of heat. That is, acetylacetone has a reaction-suppressing effect at low temperatures and conversely a reaction-accelerating effect at high temperatures. The mixture liquids were then allowed to stand in a thermostatic room at 30°C., and the viscosity/time change was measured. The results are shown in FIG. 2. As seen from the diagram, by the addition of only 0.02 weight part of acetylacetone, the viscosity/time change was extended to about 2.5 to 3 times. By the addition of 0.06 part of acetylacetone, it was extended to about 4 times, but the system containing 0.1 part showed only the same degree of effect as the system containing 0.06 part.

Example 2

Compounding:
| | |
|---|---|
| Desmodur N (trimer of hexamethylene diisocyanate, produced by Bayer A. G.) | 200 g. |
| Sunnix GP-250 (an ether compound of 1 mol glycerine and 3 mol propylene glycol; average molecular weight 250) | 60 g. |
| Hydrogenated bisphenol A | 40 g. |
| Polypropylene glycol monomethacrylate (Average molecular weight 1000) | 24 g. |
| Triethylene glycol dimethacrylate | 36 g. |

Hydrogenated bisphenol A was dissolved in Sunnix GP-250 under heating and then the mixture was cooled to room temperature. The other components and 0.15 g. acetylacetone were added thereto, and mixed thoroughly under stirring Thereafter, part of this mixture liquid was applied on a glass plate so as to be several hundred micron thick, and was cured in a hot air current dryer maintained at 150°C. for 20 minutes. A cured film was obtained which had the same hardness as that obtained from the same system containing no acetylacetone. The mixture was measured for the viscosity/time change in a thermostatic room at 30°C. The change ratio was only one-fourth that of the system containing no acetylacetone.

Comparitive Example 1

Compounding:
| | |
|---|---|
| Desmodur L (a polymer of 1 mol trimethylolpropane and 3 mol tolylene diisocyanate, containing 25 % ethyl acetate; produced by Bayer A. G.) | 220 g. |
| Desmophen 550 U (an ether compound of 1 mol trimethylolpropane and 3 mol polypropylene glycol, molecular weight about 550) | 100 g. |
| Ethyl acetate | 300 g. |

The above-mentioned components were thoroughly mixed under stirring until the solution became uniform. To this solution, 0.32 g. (1 weight part) of acetylacetone was added. This liquid was measured for the viscosity/time change in a thermostatic room maintained at 30°C. But there was no significant difference between the system containing acetylacetone and the system which did not contain it.

Comparative Example 2

Compounding:
| | |
|---|---|
| Takenate D-110N (trimer of xylylene diisocyanate, containing 25 % ethyl acetate; produced by Takeda Chemical Industries, Ltd.) | 250 g. |
| Desmophen 550 U (an ether compound of 1 mol trimethylolpropane and 3 mol propylene glycol, molecular weight about 550) | 100 g. |
| Ethyl acetate | 300 g. |

The above-mentioned components were thoroughly mixed under stirring until a uniform solution was obtained. To this mixture, 0.26 g. (about 0.1 weight part) acetylacetone was added. The thus-obtained liquid was measured for the viscosity/time change in a thermostatic room maintained at 30°C. But there was no significant difference between the system containing acetylacetone and the system which did not contain it.

What we claim is:

1. A curable polyurethane composition consisting essentially of a keto compound and a liquid mixture of an organic aliphatic polyfunctional polyisocyanate and a compound having active hydrogen selected from the group consisting of water, polyhydric alcohols, amines and phenols, the keto compound having the general formula:

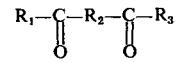

wherein $R_1$ and $R_3$ are each an alkyl group, an aromatic group, or a heterocyclic group, which may be the same or different, and $R_2$ is a lower alkylene or alkenyl group having 1 to 2 carbon atoms, and the amount of the keto compound being 0.001 to 1 weight part per 100 weight parts of said urethane composition.

2. A composition according to claim 1, wherein the diketo compound is acetylacetone, 1-phenyl-1,3-butane-dione, trans-1,4-diphenyl-2-butene-1,4-one, 4,4,4-trifluoro-1-(2-thienyl)-1,3-butanedione, or 1,3-diphenyl-1,3-propanedione.

3. A composition according to claim 1, wherein the organic polyfunctional polyisocyanate is methyl diisocyanate, ethyl diisocyanate, n-butyl diisocyanate, n-propyl diisocyanate, octadecyl diisocyanate, hexamethylene diisocyanate, their oligomers or mixtures thereof.

4. A composition according to claim 1 wherein the liquid mixture contains a solvent.

5. A composition according to claim 4 wherein the solvent is an ester, a ketone, a cyclic ether, a halogenated hydrocarbon or an aromatic hydrocarbon.

6. A composition according to claim 1 wherein the compound having an active hydrogen is a polyhydroxy alcohol.

\* \* \* \* \*